(12) United States Patent
Jutte et al.

(10) Patent No.: US 7,164,624 B2
(45) Date of Patent: Jan. 16, 2007

(54) OPTICAL SCANNING DEVICE

(75) Inventors: Petrus Theodorus Jutte, Eindhoven (NL); Jacobus Maria Antonius Van Den Eerenbeemd, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 382 days.

(21) Appl. No.: 10/492,451

(22) PCT Filed: Oct. 16, 2002

(86) PCT No.: PCT/IB02/04284

§ 371 (c)(1),
(2), (4) Date: Apr. 13, 2004

(87) PCT Pub. No.: WO03/034143

PCT Pub. Date: Apr. 24, 2003

(65) Prior Publication Data

US 2005/0001141 A1    Jan. 6, 2005

(30) Foreign Application Priority Data

Oct. 16, 2001 (EP) ............................... 012039012

(51) Int. Cl.
*G11B 7/00* (2006.01)
*G02B 27/40* (2006.01)
(52) U.S. Cl. .......................... 369/44.23; 369/112.23; 359/719; 250/201.5

(58) Field of Classification Search ............. 369/44.23, 369/112.23; 359/719; 250/201.5; G11B 7/00; G02B 3/02, 27/40
See application file for complete search history.

(56) References Cited

U.S. PATENT DOCUMENTS

| | | | | |
|---|---|---|---|---|
| 5,036,185 A | * | 7/1991 | Ando | 250/201.5 |
| 6,091,692 A | * | 7/2000 | Morimoto | 369/112.17 |
| 6,967,908 B1 | * | 11/2005 | Ogasawara et al. | 369/44.42 |

* cited by examiner

*Primary Examiner*—Aristotelis M Psitos

(57) ABSTRACT

An optical scanning device (1) for scanning an information layer (2) includes a radiation source (6) for supplying a radiation beam (14), a lens system (7) having an optical axis (OO'), and a detection system 8) including: (i) an astigmatism generating element (9) for generating a first amount of astigmatism ($W_1$) represented by a vector ($W_{o,1}$, $\theta_1$), so as to transform the radiation beam to a first astigmatic radiation beam (29); (ii) an astigmatism correcting element (27) for generating a second amount of astigmatism ($W_2$) represented by a vector ($W_{o,2}$, $\theta_2$), so as to transform the first astigmatic radiation beam to a second astigmatic radiation beam (30) having a third amount of astigmatism ($W_3$) represented by a vector ($W_{o,3}$, $\theta_3$), and (iii) a detector (28) for transforming the second astigmatic radiation beam to an electrical signal. According to the invention, $W_3$ is adapted to the detector and that $W_{o,2}$ and $\theta_2$ comply substantially with the following equation: ($W_{o,1}$, $2\theta_1$)+($W_{o,2}$, $2\theta_2$)=($W_{o,3}$, $2\theta_3$).

10 Claims, 9 Drawing Sheets

OPTICAL SCANNING DEVICE

Figure 1A:
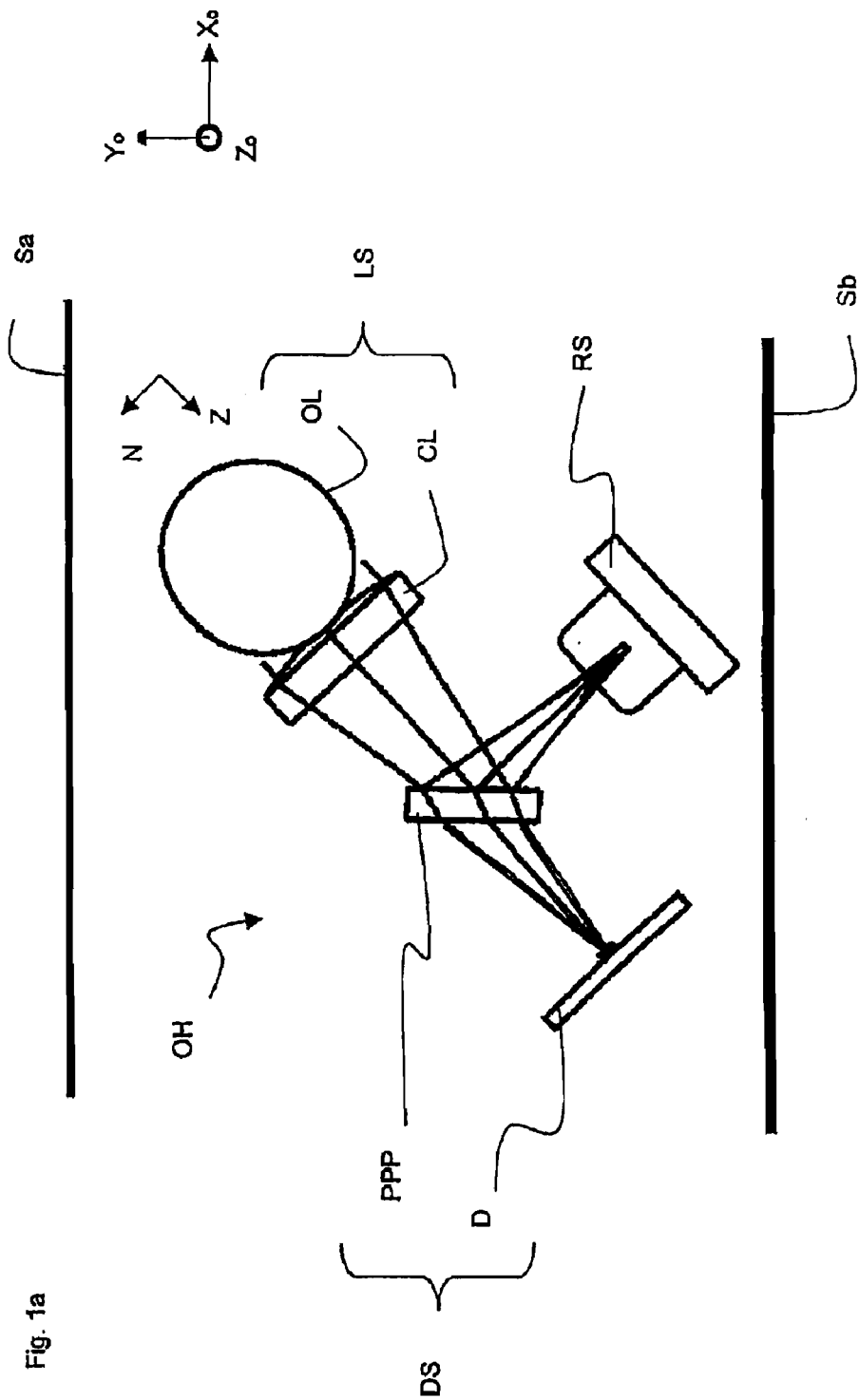

The invention relates to an optical scanning device for scanning an information layer, the device including (a) a radiation source for supplying a first radiation beam, (b) a lens system for transforming said first radiation beam to a scanning spot in said information layer, the lens system having an optical axis, and a (c) detection system including:

an astigmatism generating element for generating a first amount of astigmatism $W_1$ so as to transform said first radiation beam to a first astigmatic radiation beam having a first focal line and a second focal line which is further from said astigmatism generating element than said first focal line, said first amount of astigmatism being represented by a vector $(W_{o,1}, \theta_1)$ in a reference plane perpendicular to said optical axis, where $W_{o,1}$ represents the magnitude of $W_1$ and $\theta_1$ represents the angle between said first focal line and a reference axis which is perpendicular to said optical axis;

an astigmatism correcting element for generating a second amount of astigmatism $W_2$ so as to transform said first astigmatic radiation beam to a second astigmatic radiation beam having a third amount of astigmatism $W_3$, said second amount of astigmatism being represented by a vector $(W_{o,2}, \theta_2)$ in said reference plane, and said third amount of astigmatism being represented by a vector $(W_{o,3}, \theta_3)$ in said reference plane, and a detector for transforming said third radiation beam to an electrical signal.

In the present description, "scanning an information layer" refers to scanning with a radiation beam for reading information from the information layer ("reading mode"), writing information on the information layer ("writing mode"), and/or erasing information from the information layer.

In the present description, an amount of astigmatism is characterized as follows. Considering an optical element having an optical axis, an entrance surface and an exit surface and that the optical element generates an amount of astigmatism W so as to transform an incident, non-astigmatic radiation beam to an emerging, astigmatic radiation beam having a first focal line and a second focal line which is further from the exit surface than the first focal line. The amount of astigmatism W is represented by a vector $(W_o, \theta)$ in a reference plane (XY) perpendicular to the optical axis, where $W_o$ represents the magnitude of W and $\theta$ is an angle that represents the direction of W. The magnitude $W_o$ is represented by a Seidel coefficient; alternatively, it may be represented by a Zernike coefficient, a peak-value of the wavefront aberration, the "astigmatic distance" or longitudinal aberration (which corresponds to the distance between the first and second focal lines). The angle $\theta$ is represented by the angle between the direction of the first focal line and a reference axis (X) which is perpendicular to the optical axis.

Generally speaking, it is important to keep the scanning spot on track, that is, to maintain the scanning spot in focus on the information layer which is to be scanned and to maintain the scanning spot on the center line of the track to be scanned. In the following, for a given track, the "radial direction" means the direction between the track and the center of the disc and the "tangential direction" means the direction that is tangential to the track and perpendicular to the radial direction.

In order to maintain the scanning spot in focus on the information layer which is to be scanned, a "focus error signal" is commonly formed according to the so-called "astigmatic method" which is known from, inter alia, the book by G. Bouwhuis, J. Braat, A. Huijser et al, "Principles of Optical Disc Systems," p.75–80 (Adam Hilger 1985) (ISBN 0-85274-785-3). This method is based upon an optical aberration called astigmatism which is deliberately introduced in the optical path of the radiation beam. More specifically, the astigmatism generating element transforms the radiation beam to a radiation beam having an astigmatism that has an angle (preferably 45°) with respect to the radial direction. The detector transforms this astigmatic radiation beam to the focus error signal, this signal being further used for mechanically adjusting the position of the lens system along its optic axis for maintaining the scanning spot in focus on the information layer. When the scanning spot is in focus on the information layer, the shape of the spot on the detector is circular and therefore the focus error signal equals 0. When the scanning spot is too close to or too far from the information layer, the radiation beam reflected by the disc via the lens system is divergent or convergent: the shape of the spot on the detector is elliptical and therefore the focus error signal differs from zero.

In order to maintain the scanning spot in the right track, a "radial-tracking error signal" may be formed according to the so-called "radial push-pull method" known from, inter alia, said book by G. Bouwhuis et al, p. 70–73. This signal is further used for mechanically adjusting the position of the lens system along the radial direction for maintaining the scanning spot in the track of the information layer which has to be scanned.

FIG. 1a of the present description shows a known optical scanning device in a known configuration which enables the generation of the focus error signal and the radial tracking error signal. The known device scans a track of an optical record carrier along the center line of the track. With reference to FIG. 1a, "$X_o$" and "$Y_o$" are two reference axes parallel to the radial direction and the tangential direction, respectively, and "$Z_o$" is a reference axis which forms, together with the axes $X_o$ and $Y_o$, an orthogonal base. The known device includes two shafts Sa and Sb and an optical scanning head OH. The optical scanning head is able to move along the shafts Sa and Sb, in a direction parallel to the axis $X_o$, thereby allowing scanning from one track to another track and adjusting the position of the scanning spot on the center line of the track to be scanned. The optical scanning head OH includes a radiation source RS, a lens system LS and a detection system DS. The lens system LS includes a collimator lens CL, an objective lens OL and a plane mirror (not shown in FIG. 1a). The plane mirror is arranged below the objective lens OL along the axis $Z_o$. The normal to the plane of the mirror divides the angle of 90° between the axis $Z_o$ and a reference axis Z. As shown in FIG. 1a, "Z" is the reference axis having the same direction as the optical axis between the detector D and the collimator lens CL. The axis Z makes an angle of 45° with the tangential direction $Y_o$. During scanning, a radiation beam is emitted from the radiation source RS and directed to the track to be scanned via the lens system LS. The radiation beam then reflects on the track to be scanned in the form of a main reflected radiation beam and diffraction radiation beams (mainly a $+1^{st}$-order diffraction beam and a $-1^{st}$-order diffraction beam). The diffraction beams have the shape of half-lobes in the cross-section of the main radiation beam. The main reflected radiation beam and the $+1^{st}$-and $-1^{st}$-order diffraction beams are directed to the detection system DS via the lens system LS. The detection system DS includes (1) a plane parallel plate PPP used as both a beam splitter and an astigmatism generating element and (2) the detector D. In the configuration shown in FIG. 1a, the orientation of the plate PPP causes the focal lines of beams as generated by the astigmatism to have an angle of 0° or 90° with a reference axis N which is perpendicular to the axis Z and contained in the plane of the drawing. The direction of the track (that is, the tangential direction along the axis $Y_o$) and the orientation of the mirror cause the $+1^{st}$ order diffraction lobe and the $-1^{st}$ order diffraction lobe to have angles of 45° with the axis N on the detector D. In this case, the angle of 45° between the focal lines and the lobes allows use of a quadrant detector as the detector D, to generate a radial error signal and a focus error signal using the push-pull method and the astigmatic method, respectively.

Figure 1B:
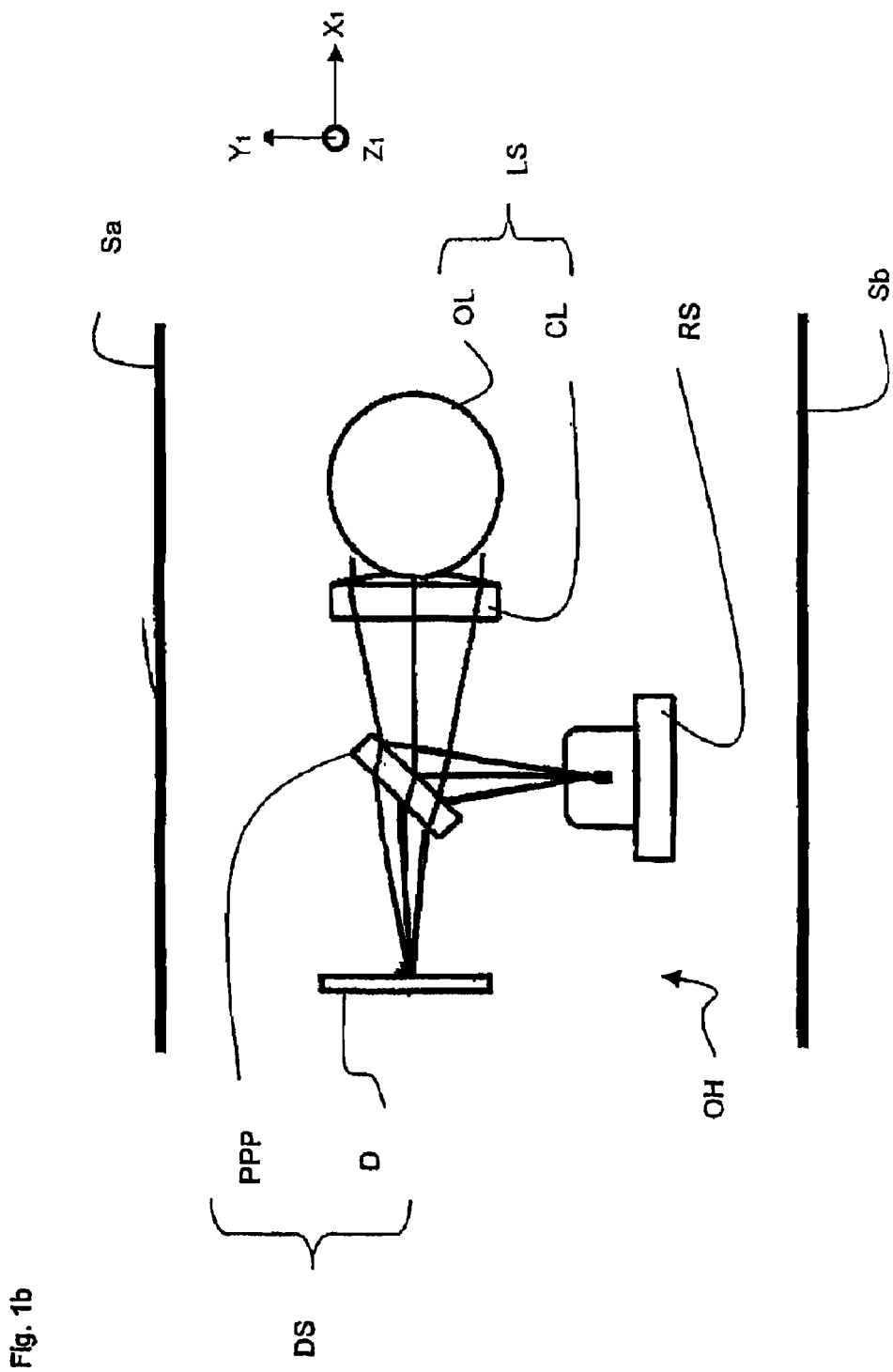

However, for mechanical reasons such as mechanical space, it is advantageous to have an orientation of 0° or 90° as shown in FIG. 1b.

The known device of FIG. 1b has the same components than those of the known device of FIG. 1a but arranged in a different configuration. With reference to FIG. 1b, "$X_1$" and "$Y_1$" are two reference axes parallel to the radial direction and the tangential direction, respectively, and "$Z_1$" is a reference axis which forms, together with the axes $X_1$ and $Y_1$, an orthogonal base. The known device of FIG. 1b scans a track of an optical record carrier along the center line of the track, which is parallel the axis $Y_1$. The optical scanning head OH is able to move along the shafts Sa and Sb, in a direction parallel to the axis $X_1$. The plane mirror of the lens system LS (not shown in FIG. 1b) is arranged below the objective lens OL along the axis $Z_1$. The normal to the plane of the mirror divides the angle of 45° between the axes $X_1$ and $Z_1$.

However, in the configuration shown in FIG. 1b, the optical scanning device has the disadvantage that, without further measures, it does not enable to form the focus error signal and the radial tracking error signal simultaneously. As explained with respect to FIG. 1a, the orientation of the plate PPP causes the focal lines of beams as generated by the astigmatism to have an angle of 0° or 90° with the axis N. The direction of the track (that is, the tangential direction along the axis $Y_1$) and the orientation of the mirror cause the $+1^{st}$ order diffraction lobe and the $-1^{st}$ order diffraction lobe on the detector D to have an angle of −90° or +90° with the axis N. In this case, by using a quadrant detector as the detector D, the mutual orientation of the lobes and the focal lines does not allow to generate simultaneously a radial error signal and a focus error signal by using the push-pull method and the astigmatic method, respectively.

A solution to remedy this disadvantage is known from U.S. Pat. No. 4,731,527. According to the known solution, the detection system further comprises an astigmatism correcting element formed by a cylindrical lens. As explained in U.S. Pat. No. 4,731,527, the astigmatism generating element generates a first amount of astigmatism $W_a$ and the astigmatism correcting element generates a second amount of astigmatism $W_b$. The cylindrical lens is arranged so that the amount of astigmatism $W_c$ is made to provide the maximum sensitivity of the quadrant detector, i.e. to be oriented at 45° with respect to the radial direction according to the "astigmatic method." This is achieved, according to U.S. Pat. No. 4,731,527, when the amounts of astigmatism $W_a$, $W_b$ and $W_c$ meet the following equation:

$$W_c = W_a + W_b \quad (1)$$

Figure 2:
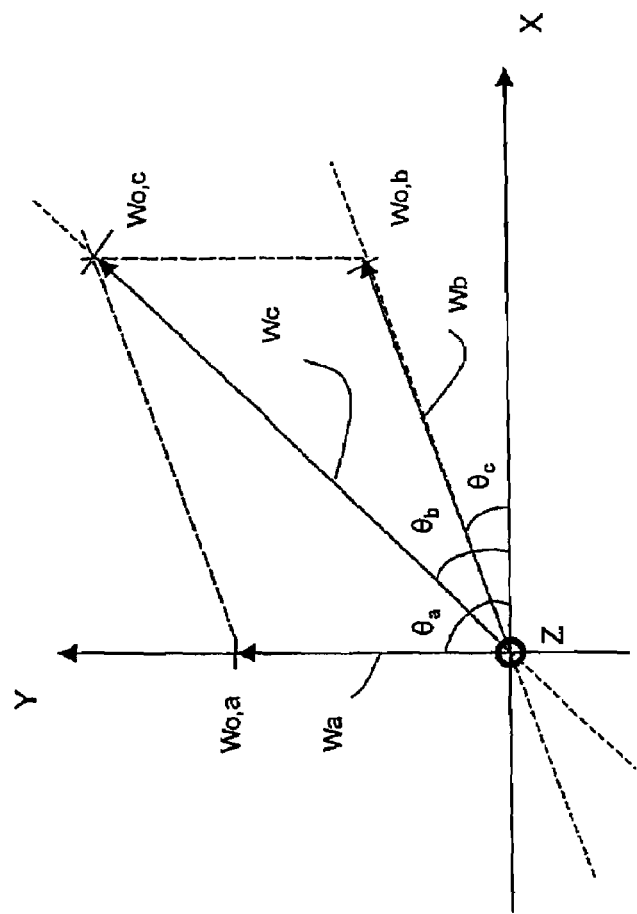

According to Equation (1), FIG. 2 of the present description shows the relationship between the amounts of astigmatism $W_a$, $W_b$ and $W_c$ in a reference plane XY that is perpendicular to an optical axis of the detection system where $W_{o,a}$, $W_{o,b}$ and $W_{o,c}$ are the magnitudes of $W_a$, $W_b$ and $W_c$, respectively, and $\theta_a$, $\theta_b$ and $\theta_c$ which are the angles of $W_a$, $W_b$ and $W_c$, respectively. By using the vector representation of the amounts of astigmatism, Equation (1) may also be expressed as follows:

$$(W_{o,c}, \theta_c) = (W_{o,a}, \theta_a) + (W_{o,b}, \theta_b) \quad (2)$$

However, the teaching of U.S. Pat. No. 4,731,527 is unsatisfactory, since it does not provide the desired correction of the astigmatism.

Other optical scanning devices including an astigmatism correcting element are disclosed in the prior art, such as U.S. Pat. No. 4,968,874.

U.S. Pat. No. 4,968,874 discloses an optical scanning device as described in the opening paragraph wherein the astigmatic correcting element includes a first anisotropically curved surface for compensating the astigmatism generated by the astigmatism generating element and a second anisotropically curved surface for generating a new astigmatism in an arbitrary direction, that is, 45° with respect to the radial direction.

A disadvantage of the astigmatism correcting element described in U.S. Pat. No. 4,968,874 is that it includes two anisotropically curved surfaces which are difficult to manufacture.

An object of the invention is to provide an optical scanning device that remedies the aforementioned disadvantages, in particular, that provides astigmatism aberration according to the "astigmatic method" and that is easy to manufacture.

In accordance with the invention, these objects are achieved by an optical scanning device as described in the opening paragraph, which is characterized in that $W_3$ is adapted to said detector and that $W_{o,2}$ and $\theta_2$ comply substantially with:

$$(W_{o,1}, 2\theta_1) + (W_{o,2}, 2\theta_2) = (W_{o,3}, 2\theta_3).$$

An advantage of the optical scanning device according to the invention is that it allows the skilled person to correct the astigmatism as desired, as shown below in further detail (in particular in relation to Tables 3 and 4).

In a preferred embodiment of the optical scanning device, the astigmatism correcting element is formed by a cylindrical surface having an axis of symmetry that forms a predetermined first angle with respect of the first focal line, the value of this angle depending on the desired angle, the first astigmatic distance and the second astigmatic distance.

An advantage of forming the astigmatism correcting element with a cylindrical surface is that it is easier to manufacture one anisotropically curved surface than two anisotropically curved surfaces like those described with reference to U.S. Pat. No. 4,968,874. In the present description, an "anisotropically curved surface" means a surface with different curvatures and/or aspherical coefficients in two mutually perpendicular directions.

Another advantage of an astigmatism correcting element with a cylindrical surface is that the cylindrical surface is less sensitive to mechanical tolerance changes than an anisotropically curved surface, like those of the astigmatism correcting element described in U.S. Pat. No. 4,968,874.

In a preferred embodiment of the optical scanning device, the astigmatism generating element is formed by a plane parallel plate that is tilted with a predetermined angle between the normal direction of this plate and the optical axis. This embodiment can also be used as beam splitter to redirect the radiation beam from the radiation source in the direction of the lens system.

An advantage of forming the astigmatism generating element with a plane parallel plate is that the plane parallel plate is cheaper than other astigmatism generating element that can be found in the commerce, such as a beam splitting cube.

Another advantage of forming the astigmatism generating element with a plane parallel plate is that the plane parallel plate is generally thinner than a beam splitting cube, thereby leading to a more compact optical scanning device.

Figure 3:
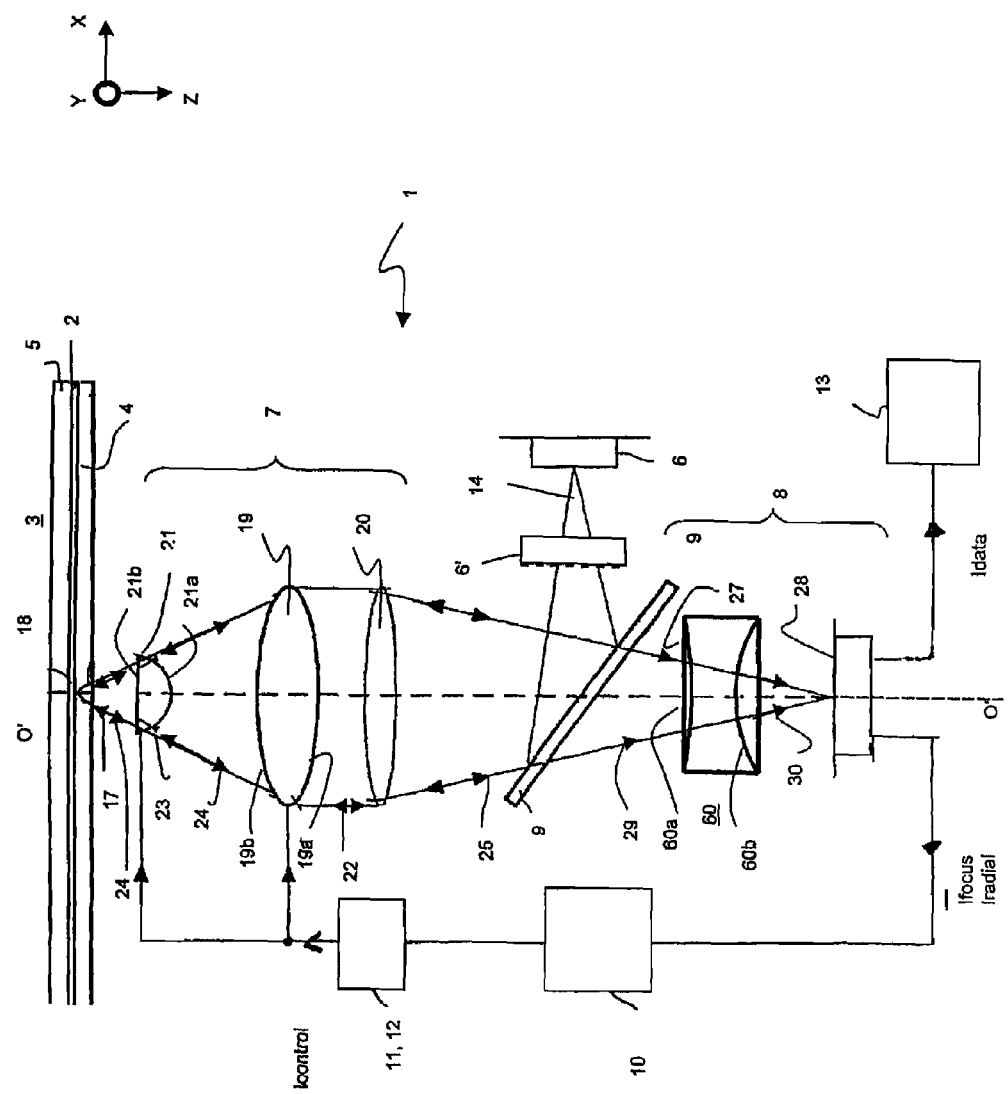
Figure 4:
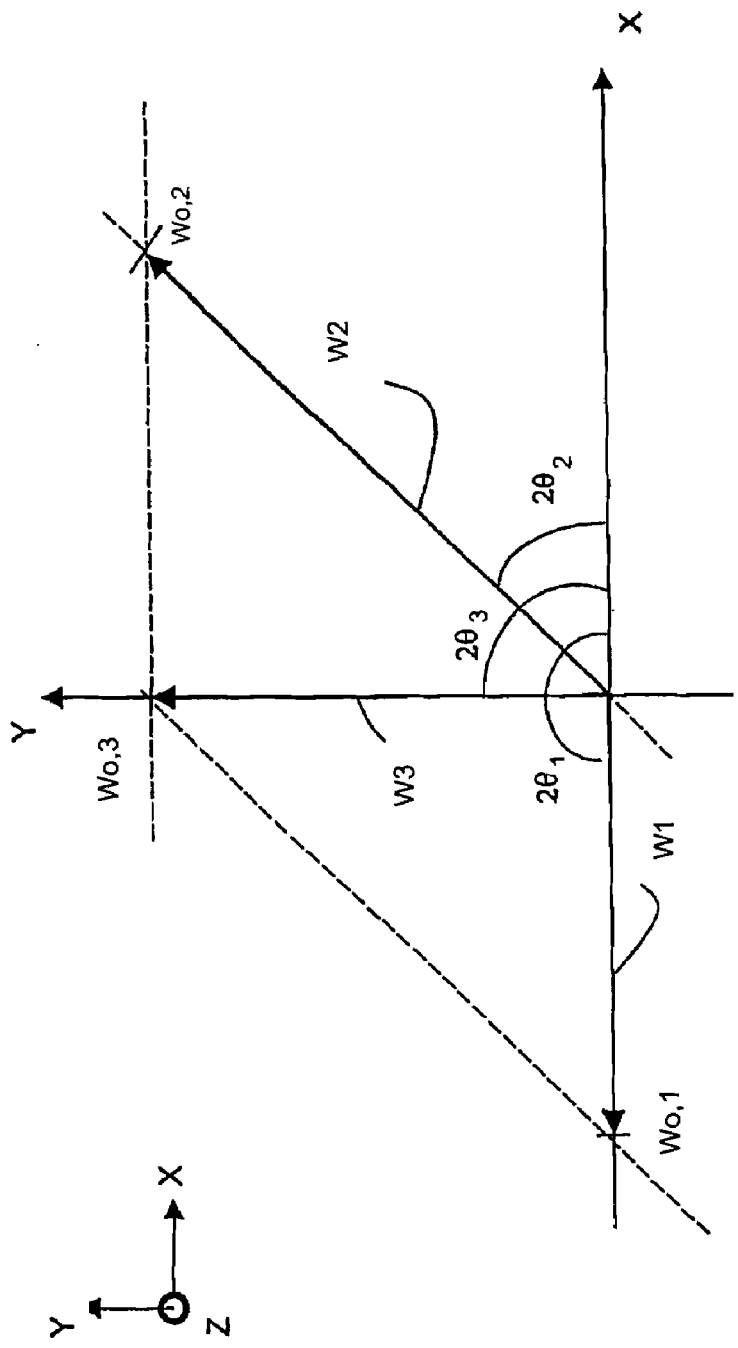
Figure 5:
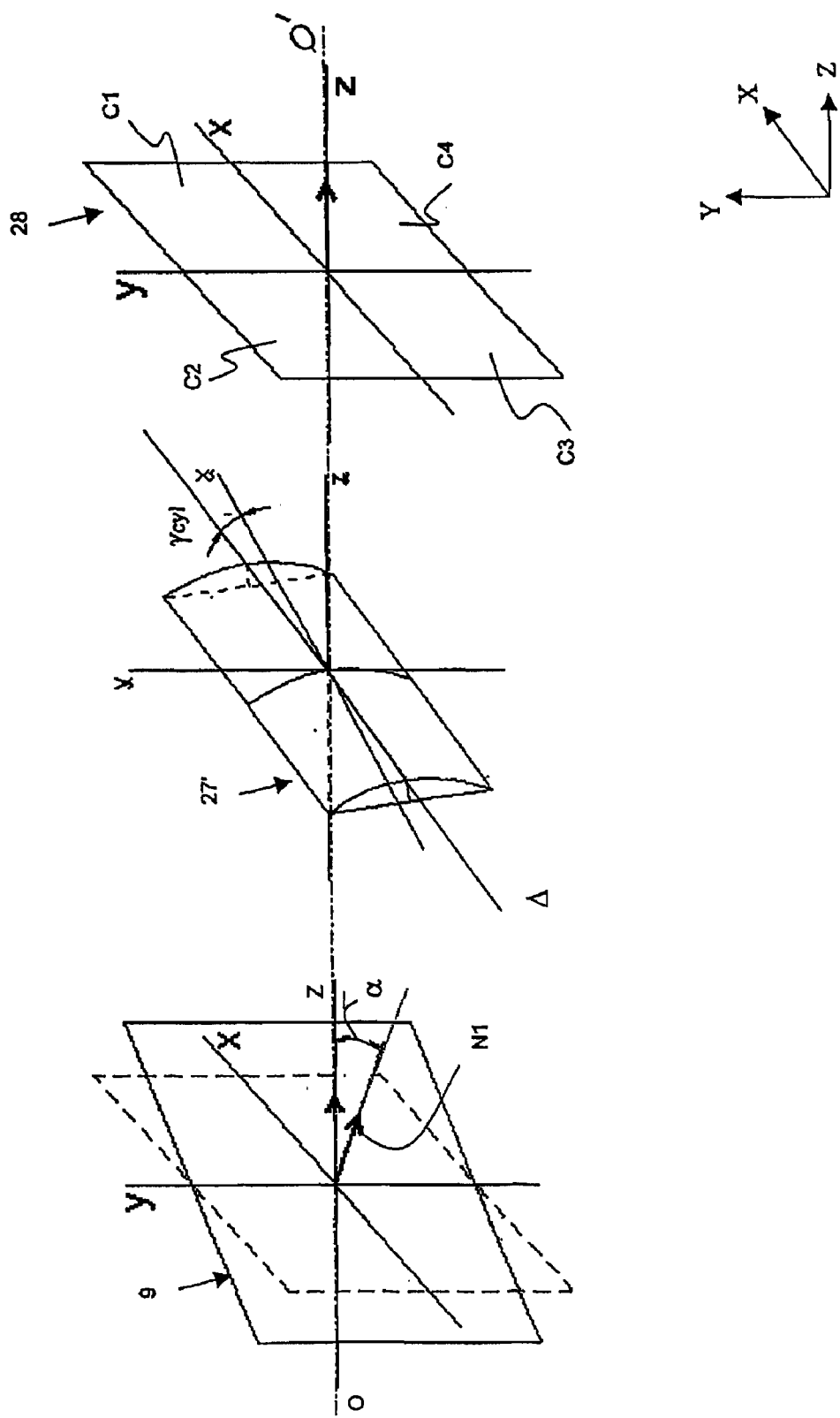

The objects, advantages and features of the invention will be apparent from the following, more detailed description of the invention, as illustrated in the accompanying drawings, in which:

FIGS. 1a and 1b show a known optical scanning device in a first configuration and a second configuration, respectively;

FIG. 2 is a graph showing the relationship between three amounts of astigmatism according to the teaching of a prior art document, FIG. 3 is a schematic illustration of components of an optical scanning device according to one embodiment of the invention, FIG. 4 is a graph showing the relationships between three amounts of astigmatism, according to the present invention, FIG. 5 is a schematic illustration of a first embodiment of the detection system shown in FIG. 3

Figure 6:
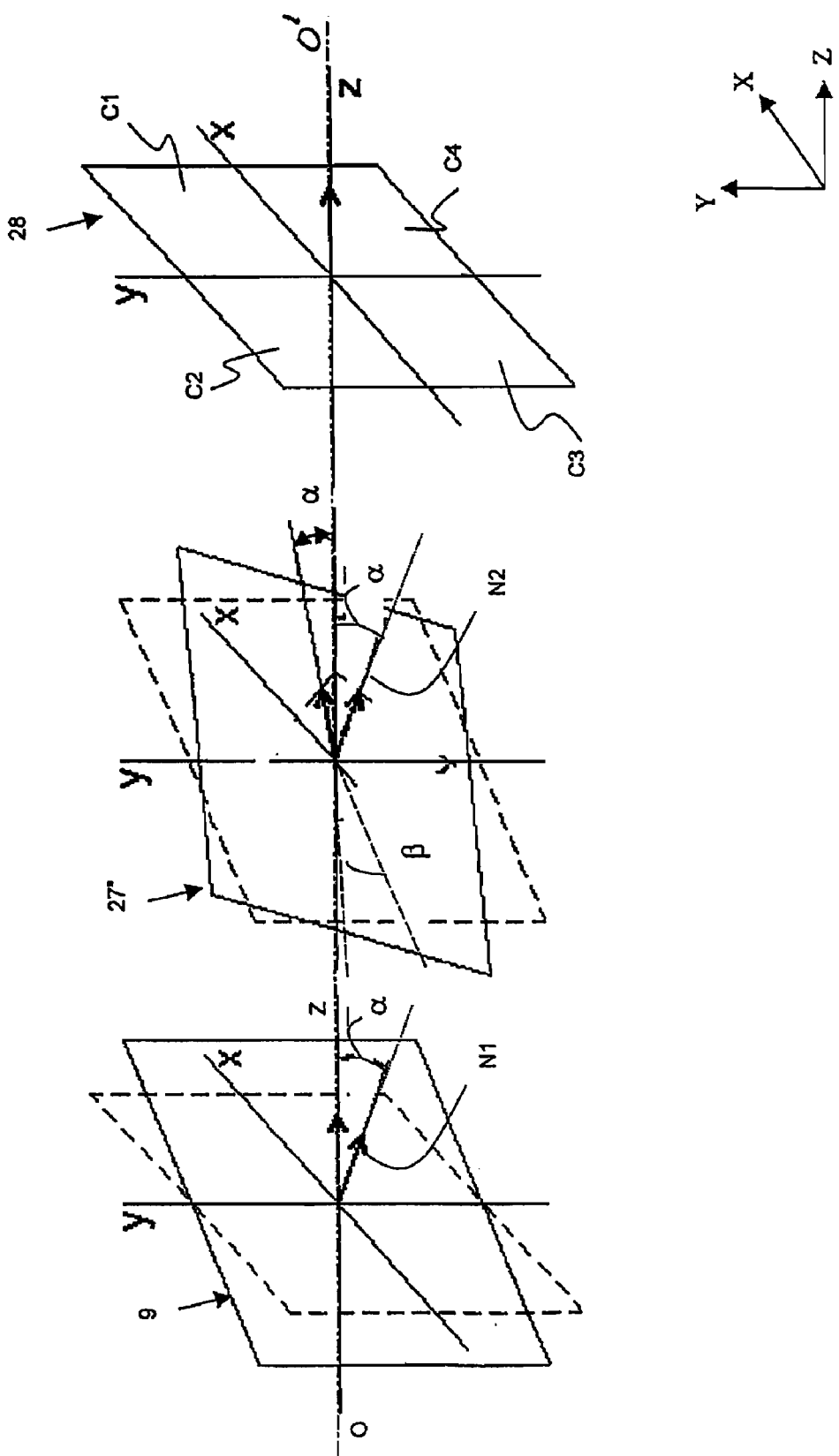

FIG. 6 is a schematic illustration of a second embodiment of the detection system shown in FIG. 3

Figure 7:
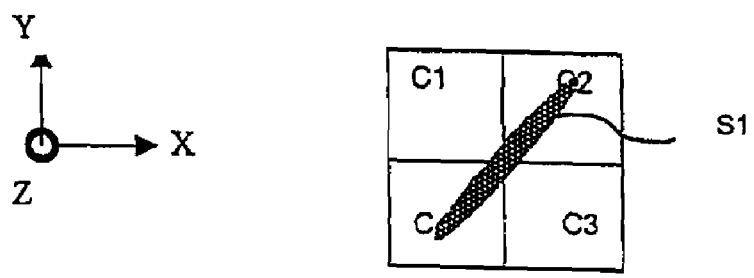
Figure 8:
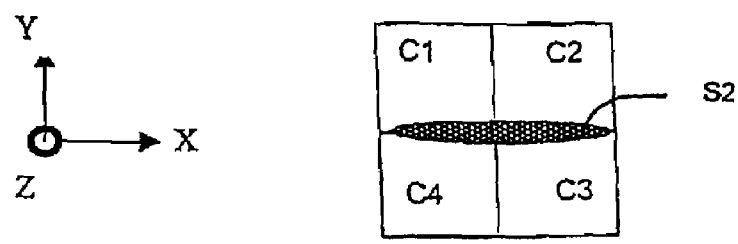
Figure 9:
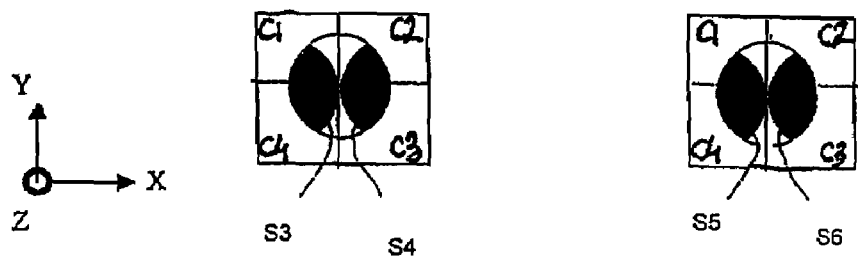
Figure 10:
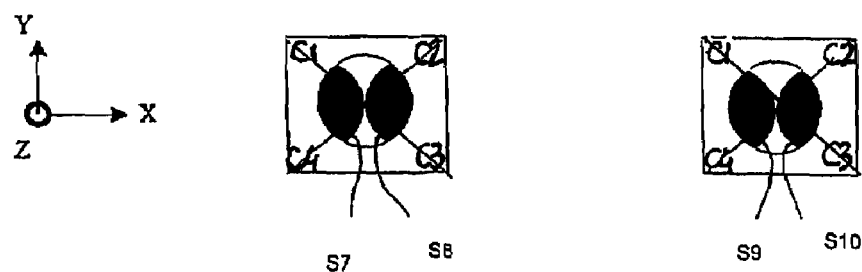

FIGS. 7 and 8 are schematic representations of the central radiation beam formed on the quadrant detector shown in FIGS. 5 and 6, with and without correction according to the invention, respectively, and FIGS. 9 and 10 are schematic representations of the satellite radiation beams formed on the quadrant detector shown in FIGS. 5 and 6, with and without correction according to the invention, respectively.

FIG. 3 is a schematic illustration of components of an optical scanning device 1 according to the invention for scanning an information layer 2 of an optical record carrier 3. The configuration of the components shown in FIG. 3 is the same than the configuration of FIG. 1b; however, the mirror of the lens system described with reference to FIG. 1b has not been drawn in FIG. 3 for clarity reasons. Notably, as a matter of purely arbitrary choice and with reference to FIG. 3 and seq., "X-axis" and "Y-axis" are reference axes corresponding to the radial direction and the tangential direction of the optical record carrier, respectively, and "Z-axis" is a reference axis parallel to an optical axis in the optical scanning device 1.

By way of illustration, the optical record carrier 3 includes a transparent layer 4 on one side of which the information layer 2 is arranged. The side of the information layer 2 facing away from the transparent layer 4 is protected from environmental influences by a protective layer 5. As shown in FIG. 3, the layers 2, 4 and 5 are planar in the directions of the X-axis and the Y-axis indicated in FIG. 3. The transparent layer 4 acts as a substrate for the carrier 3 by providing mechanical support for the information layer 2. Alternatively, the transparent layer 4 may have the sole function of protecting the information layer 2, while the mechanical support is provided by a layer on the other side of the information layer 2, for instance by the protection layer or by an additional information layer and transparent layer connected to the uppermost information layer. The information layer 2 is a surface of the carrier 3 that contains tracks. A "track" is a path to be followed by a focused radiation beam on which path optically-readable marks representative of information are arranged. The marks may be, e.g., in the form of pits or areas with a reflection coefficient or a direction of magnetization different from the surroundings. In the case where the optical record carrier 3 has the shape of a disc, the following is defined with respect to a given track: the "radial direction" is the direction between the track and the center of the disc and the "tangential direction" is the direction that is tangential to the track and perpendicular to the "radial direction."

As shown in FIG. 3, the optical scanning device 1 includes a radiation source 6, a lens system 7 having an optical axis OO', and a detection system 8. The X-axis is perpendicular to the optical axis OO' and parallel to the radial direction. The Y-axis is perpendicular to the optical axis OO' and to the X-axis. The Z-axis is parallel to the optical axis OO' and therefore is perpendicular to both the X-axis and the Y-axis.

As also shown in FIG. 3, the optical scanning device 1 preferably further includes a beam splitter, a servo circuit 10, a focus actuator 11 and a radial actuator 12, and an information processing unit for error correction 13.

The radiation source 6 is arranged for supplying a radiation beam 14. Preferably, the radiation source 6 includes at least one semiconductor laser that emits the radiation beam 14 at a selected wavelength $\lambda$. For instance, in the case where the optical record carrier 3 is of the so-called DVD format, the wavelength $\lambda$ of the radiation beam 14 is between 620 and 700 nm and, preferably, equals 660 nm and, in the case where the optical record carrier 3 is of the so-called DVR-format, the wavelength $\lambda$ preferably equals 405 nm. More preferably, the radiation source 6 includes a grating structure 6' for forming two satellite radiation beams (not shown in the figures) from the central radiation beam 14; the satellite beams are used for generating the radial-tracking error signal.

The beam splitter is arranged for reflecting the radiation beam 14 (as well as the two satellite radiation beams) toward the lens system 7. In the preferred embodiment shown in FIG. 3, the beam splitter is formed by a plane parallel plate 9 that is tilted with respect to the optical axis OO' so as to form an angle $\alpha$ with respect to this axis. Preferably, the angle $\alpha$ equals 45°. Alternatively, the beam splitter may be formed by a grating structure or a hologram.

The lens system 7 is arranged for transforming the radiation beam 14 to a focused radiation beam 17 so as to form a scanning spot 18 in the position of the information layer 2. Preferably, the lens system 7 includes a first objective lens 19. It further includes a collimator lens 20 and a second objective lens 21. Preferably, the second objective lens 21 is used together with the first objective lens 20 in the case where the numerical aperture of the radiation beam 17 approximately equals 0.85, while only the first objective lens 20 is used in the case where the numerical aperture of the radiation beam 17 is smaller than 0.65.

The collimator lens 20 is arranged for transforming the radiation beam 14 (as well as the two satellite radiation beams) into a substantially collimated radiation beam 22.

The objective lens 19 is arranged for transforming the collimated radiation beam 22 to a converging radiation beam 23. The objective lens 19 has an entrance surface 19a for receiving the radiation beam 22 and an exit surface 19b for outputting the converging beam 17.

The second objective lens 21 is arranged for transforming the converging radiation beam 23 to the focused radiation beam 17. The lens 21 may be a plano-convex lens having a convex entrance surface 21a that faces the exit surface 19b of the objective lens 19, and a flat exit surface 21b that faces the position of the information layer 2. Notably, the second objective lens 21 forms, in cooperation with the first objective lens 19, a doublet-lens system that has advantageously a larger tolerance in mutual position of the optical elements than a single-lens system. Furthermore, one or two surfaces of each of the objective lenses 19 and 21 are preferably aspherical.

By way of illustration, in the case where the optical record carrier 3 is of the DVD format, the numerical aperture of the focused radiation beam 17 approximately equals 0.6 for the "reading mode" and preferably 0.65 for the "writing mode."

During scanning, the forward focused radiation beam 17 reflects on the information layer 2, thereby forming a backward radiation beam 24 which returns on the optical path of the forward focused radiation beam 17. The lens system 7 transforms the backward radiation beam 24 to a first backward radiation beam 25. Finally, the beam splitter 9 separates the forward radiation beam 14 from the backward radiation beam 25 by transmitting at least part of the backward radiation beam 25 towards the detection system 8.

The detection system 8 is arranged for capturing the radiation beam 25 (as well as the corresponding satellite radiation beams not shown in FIG. 3) and converting them into one or more electrical signals. One of the signals is an information signal $I_{data}$, the value of which represents the information scanned on the information layer 2. The information signal $I_{data}$ is processed by the information layer processing unit 13 for error correction. Other signals from the detection system 8 are a focus error signal $I_{focus}$ and a radial tracking error signal $I_{radial}$. The signal $I_{focus}$ represents the axial difference in height along the optical axis OO' between the scanning spot 18 and the position of the information layer 2. Preferably, this signal is formed by the "astigmatic method" as described above. The signal $I_{radial}$ represents the distance in the plane of the information layer 2 between the scanning spot 18 and the center line of a track on the information layer 2 to be followed by the scanning spot 18. Preferably, the signal $I_{radial}$ is formed from the "radial push pull method" as described above.

The servo circuit 10 is arranged for, in response to the signals $I_{focus}$ and $I_{radial}$, providing servo control signals $I_{control}$ for controlling the focus actuator 11 and the radial actuator 13, respectively. The focus actuator 11 controls the positions of the objective lenses 19 and 21 along the optical axis OO', thereby controlling the actual position of the scanning spot 18 such that it coincides substantially with the plane of the information layer 2. The radial actuator 13 controls the position of the objective lenses 19 and 21 in a direction perpendicular to the optical axis OO', thereby controlling the radial positions of the scanning spot 18 such that it coincides substantially with the center line of the track to be followed on the information layer 2.

The detection system 8 is now described in further detail: it includes an astigmatism generating element, an astigmatism correcting element 27 and a quadrant detector 28.

The astigmatism generating element generates a first amount of astigmatism $W_1$ so as to transform the radiation beam 25 to a first astigmatic radiation beam 29 having a first focal line $F_1$, and a second focal line $F_2$ which is further from the astigmatism generating element 9 than focal line $F_1$. The distance $\Delta f_1$ between the first and second focal lines $F_1$ and $F_2$ is named hereafter "astigmatic distance." The first amount of astigmatism $W_1$ is represented by a vector $(W_{o,1}, \theta_1)$ in a reference plane XY perpendicular to the optical axis OO',
where $W_{o,1}$ represents the magnitude of $W_1$ and $\theta_1$ represents the angle between said first focal line and the reference axis X which is perpendicular to the optical axis OO'.

In the preferred embodiment shown in FIG. 3, the astigmatism generating element is formed by the plane parallel plate element 9 which also operates as beam splitter (see above). Alternatively, the astigmatism generating element may be formed by a cylinder lens, a toroidal element, or a hologram having an anisotropic curvature or pitch of the grating lines. The magnitude $W_{o,1}$ is expressed in the form of the Seidel coefficient $W_{22}$. The following equation gives the root-mean-square value $W_{22rms}$, normalized with respect to the wavelength $\lambda$, of the coefficient $W_{22}$:

$$W_{22rms} = \frac{NA^2 d(n^2-1)\sin^2(\alpha)}{2\lambda\sqrt{24}\,(n^2-\sin^2\alpha)^{\frac{3}{2}}} \quad (3)$$

wherein "d" is the thickness of the plane parallel plate, "n" is the refractive index of the plane parallel plate, "α" is the angle of the plane parallel plate with the optical axis (preferably 45°), and "NA" is the numerical aperture of the radiation beam that is incident to the plane parallel plate. For further information, see e.g. M. Born and E. Wolf, "Principles of Optics," p.469–470 (6$^{th}$ ed.) (Pergamon Press) (ISBN 0-08-09482-4).

The astigmatism correcting element 27 generates a second amount of astigmatism $W_2$ so as to transform the first astigmatic radiation beam 29 to a second astigmatic radiation beam 30 having a third amount of astigmatism $W_3$. The second amount of astigmatism $W_2$ is represented by a vector $(W_{o,2}, \theta_2)$ in the reference plane XY, and the third amount of astigmatism $W_3$ is represented by a vector $(W_{o,3}, \theta_3)$ in the reference plane XY. By definition, the astigmatism correcting element 27 generates the amount $W_2$ so as to transform an incident, non-astigmatic radiation beam to an emerging astigmatic radiation beam having a third focal line F3 and a fourth focal line F4 which is further from the element 27 than the focal line F3. The distance $\Delta f_2$ between the focal lines F3 and F4 is also referred to as "astigmatic distance." Similarly, the astigmatic radiation beam 30 has a fifth focal line F5 and a sixth focal line F6; the distance $\Delta f_3$ between the focal lines F5 and F6 is also referred to as "astigmatic distance."

The detector 28 transforms the radiation beam 30 to at least one electrical signal. Preferably, the detector 28 is formed by a quadrant-detector having two perpendicular separation lines.

More specifically, in the case where the quadrant detector 28 is arranged for implementing the "astigmatic method," it includes four detector elements C1 through C4 and a first electronic circuit (not shown in FIG. 3 and shown in FIGS. 5–10). The detector elements C1 through C4 are arranged in the XY-plane in the form of four separate quadrants as follows: the detector element C1 is diagonally opposed to the detector element C3; the detector elements C2 is diagonally opposed to the detector elements C4; the separation line between the detector elements C1 and C4 (as well as that between the detector elements C2 and C3) is parallel to the X-axis; and the separation line between the detector elements C1 and C2 (as well as that between the detector elements C3 and C4) is parallel to the Y-axis. The detector elements C1, C2, C3 and C4 are arranged for providing four detector element signals $I_{C1}$, $I_{C2}$, $I_{C3}$ and $I_{C4}$, respectively, that represent the light intensity of the radiation beam 14 falling on the pertaining detector elements. The first electronic circuit is arranged for transforming the signals $I_{C1}$ through $I_{C4}$ to the focus error signal $I_{focus}$ according to the following equation:

$$I_{focus} = (I_{C1} + I_{C3}) - (I_{C2} + I_{C4}). \quad (4)$$

The radial-tracking error signal $I_{radial}$ according to the radial push-pull method can be obtained by combining the signals $I_{C1}$, $I_{C2}$, $I_{C3}$ and $I_{C4}$ as follows:

$$I_{radial} = (I_{C1} + I_{C4}) - (I_{C2} + I_{C3}). \quad (5)$$

The detection of the signals $I_{C1}$ through $I_{C4}$ depends on the angles between the focal lines F3 and F4 and the separation lines of the detector elements C1 through C4 (that is, on the angle between the focal line F3 and the X-axis). Notably, one-spot and 3-spot radial tracking method can be used as radial push-pull method for forming the signal $I_{radial}$.

Furthermore, $W_3$ is adapted to the detector 28 so that the angle $\theta_3$ equals 45° with the separation lines of the detector 28; the orientation of the separation lines of the detector has been chosen so as to allow the radial tracking error signal to be generated by the push-pull method. According to the invention, $W_{o,2}$ and $\theta_2$ comply substantially with the following equation:

$$(W_{o,1}, 2\theta_1) + (W_{o,2}, 2\theta_2) = (W_{o,3}, 2\theta_3) \quad (6)$$

FIG. 4 shows the relationship of Equation (6) between the amounts of astigmatism $W_1$, $W_2$ and $W_3$ in the reference plane XY. The magnitude $W_3$ and the angle $\theta_3$ may be expressed in the plane XY with respect to any reference direction X chosen arbitrarily: the magnitude W3 and the angle $\theta_3$ are rotation-invariant in the plane XY.

Calculations have been made from Equation (6) where the magnitude $W_{o,1}$ equals an arbitrarily chosen value, $W_{o,1}^{fix}$ (=99 μm when expressed in longitudinal aberration), the angle $\theta_1$ equals an arbitrarily chosen value, $\theta_1^{fix}$ (=90°), the magnitude $W_{o,3}$ equal a desired value, $W_{o,3}^{des}$, as required by other parameters in the device (1295 μm), and the angle $\theta_3$ equal a desired value, $\theta_3^{des}$, as required by the "astigmatic method" (i.e. 45°). The magnitude $W_{o,2}^{cal2}$ and the angle $\theta_2^{cal2}$ have been calculated from Equation (6). Table 1 shows these magnitudes and angles.

TABLE 1

| $W_1^{fix}$ | | $W_2^{cal2}$ | | $W_3^{des}$ | |
| --- | --- | --- | --- | --- | --- |
| $W_{o,1}^{fix}$ | $\theta_1^{fix}$ | $W_{o,2}^{cal2}$ | $\theta_2^{cal2}$ | $W_{o,3}^{des}$ | $\theta_3^{des}$ |
| 99 μm | 90° | 1322 μm | 39° | 1295 μm | 45° |

Thus, according to the teaching of the present invention, for an amount of astigmatism $W_1$ having a magnitude of 99 μm and an angle of 90°, the astigmatism correcting element is to generate an amount of astigmatism having a magnitude of 1322 μm and an angle of 39° in order to obtain the amount of astigmatism $W_3$ as desired, i.e. with a magnitude of 1295 μm and an angle of 45°.

Ray-tracing simulations have been made from the arbitrarily chosen values $W_{o,1}^{fix}$ and $\theta_1^{fix}$ and the calculated values $W_{o,2}^{cal2}$ and $\theta_2^{cal2}$: as a result, the value of ma $W_{o,3}^{sim2}$ and the value of angle $\theta_3^{sim2}$ have been obtained. Table 2 shows these values of magnitudes and angles.

TABLE 2

| $W_1^{fix}$ | | $W_2^{cal2}$ | | $W_3^{sim2}$ | |
| --- | --- | --- | --- | --- | --- |
| $W_{o,1}^{fix}$ | $\theta_1^{fix}$ | $W_{o,2}^{cal2}$ | $\theta_2^{cal2}$ | $W_{o,3}^{sim2}$ | $\theta_3^{sim2}$ |
| 99 μm | 90° | 1322 μm | 39° | 1298 μm | 45° |

As shown in Table 2, according to the results of the simulations, if an amount of astigmatism $W_1$ having a magnitude of 99 μm and an angle of 90° is corrected by an amount of astigmatism $W_2$ having a magnitude of 1322 μm and an angle of 39°, then the resulting amount of astigmatism $W_3$ has a magnitude of 1322 μm and an angle of 45°, which substantially equal the desired values 1295 μm and 45°, respectively. In other words, there is a difference of 0.2% between the value of the magnitude obtained by calculations according to the present invention and that obtained through simulations, and there is a difference of less than 1 degree between the value of the angle obtained by calculations according to the present invention and that obtained through simulations. In the present description, a value of magnitude or angle "substantially equals" another value of magnitude or angle where the difference between the two values is less than 5%.

Two embodiments of the astigmatism correcting element according to the invention are described below. FIG. 5 is a schematic illustration of the astigmatism generating element 9, the first embodiment 27' of the astigmatism correcting element 27 and the quadrant detector 28. FIG. 6 is a schematic illustration of the astigmatism generating element 9, the second embodiment 27'' of the astigmatism correcting element 27 and the quadrant detector 28.

As shown in FIG. 5, the astigmatism correcting element 27' formed by a cylindrical surface having an axis of symmetry Δ that forms a predetermined first angle $\gamma_{cyl}$ with respect of the X-axis in the XY plane. The angle $\gamma_{cyl}$ is given by the following expression:

$$\gamma_{cyl} - \theta_3 = \tfrac{1}{2} \text{Arc } \sin[W_{o,1} \sin(2(\theta_1 - \theta_3))/(W_{o,3}^2 + W_{o,1}^2 - 2W_{o,3}W_{o,1}\cos(2(\theta_1 - \theta_3)))^{1/2}]$$

where $\theta_1 - \theta_3$, $W_{o,1}$ and $W_{o,3}$ satisfy the following condition:

$$W_{o,3}^2 + W_{o,1}^2 > 2W_{o,3}W_{o,1}\cos(2(\theta_1 - \theta_3))$$

Furthermore, the cylindrical surface is arranged for generating a third astigmatic distance $W_{o,2}$ in order to transform the magnitude $W_{o,1}$ of the astigmatism $W_1$ to the magnitude $W_{o,3}$ of the astigmatism $W_3$. More specifically, the astigmatic distance $W_{o,2}$ may be defined as follows:

$$W_{o,2} = [W_{o,3}^2 + W_{o,1}^2 - 2W_{o,3}W_{o,1}\cos(2(\theta_1 - \theta_3))]^{1/2}$$

where $\theta_1 - \theta_3$, and $W_{o,1}$ and $W_{o,3}$ satisfy the following condition:

$$W_{o,3}^2 + W_{o,1}^2 > 2W_{o,3}W_{o,1}\cos(2(\theta_1 - \theta_3)).$$

Notably, the formulae of $\gamma_{cyl} - \theta_3$ and $W_{o,2}$ are valid where $W_{o,1}$, $W_{o,2}$ and $W_{o,3}$ are represented by any of the following: a Seidel coefficient, a Zernike coefficient, a peak-value of the wavefront aberration, the "astigmatic distance" or longitudinal aberration (which corresponds to the distance between the first and second focal lines).

As shown in FIG. 6, the astigmatism correcting element 27'' is formed by a plane surface arranged as follows. The astigmatism generating element 9 is formed by a plane parallel plate which is: firstly arranged with the same orientation as the detector 28 (represented by the dashed square), and secondly rotated along the Y-axis so that the normal N1 to the plate 9 makes an angle α of 45 degrees with respect to the Z-axis. The astigmatism correcting element 27" is formed by a plane parallel plate which is: firstly arranged with the same orientation as the plate 9 (represented by the dashed square), and secondly rotated along the Z-axis so that the normal N2 to the plate 27" makes an angle β with respect to the X-axis. Preferably, the angle β equals 45° according to the astigmatic method.

As a matter of pure illustration, the effect of the correction according to the invention is now described in further detail.

FIGS. 7 and 8 are schematic representations of the focal line formed by the central radiation beam 14 on the quadrant detector 28, with and without correction according to the invention, respectively. FIGS. 9 and 10 are schematic representations of the two satellite radiation beams formed on the quadrant detector 28, with and without correction according to the invention, respectively.

FIG. 7 relates to the case where the angle $\theta_3$ between the focal line F3 and the separation line between the detector elements C1 and C2, equals 45° and the scanning spot 18 is not in focus on the information layer 2. The spot of the astigmatic radiation beam 30 has an elliptic shape S1 on the detector elements C1 through C4, wherein the main axis of the elliptical shape S1 forms an angle of 45° with respect to the X-axis (this shape corresponding to a focal line of the amount $W_3$). Therefore, the signal $I_{focus}$ formed according to the Equation (4) differs from 0. In other words, detection of the focus error is possible.

FIG. 8 relates to the case where the angle between the focal line F3 and the separation line between the detector elements C1 and C2 equals 0° and without the astigmatism correction according to the invention. Thus, the spot of the astigmatic radiation beam 30 has an elliptic shape S2 on the detector elements C1 through C4, wherein the main axis of the elliptical shape S2 forms an angle of 0° with respect to the X-axis. Therefore, the signal $I_{focus}$ formed according to Equation (4) equals 0. In other words, detection of the focus error is not possible.

FIG. 9 relates to the case where the angle $\theta_3$ between the focal line F3 and the separation line between the detectors C1 and C3 equals 45°. Notably, the direction of the Y-axis (indicated in FIG. 9) corresponds to the tangential direction (that is, the direction tangential to the track to be scanned). The first astigmatic radiation beam forms two half-lobes S3 and S4 and the second astigmatic radiation beam forms two half-lobes S5 and S6. The half-lobes S3 through S6 are oriented so as to be aligned with the direction of the separation line, that is, with the direction of the track. Thus, the signal $I_{radial}$ (formed according to Equation (5)) differs from 0. In other words, there is detection of the radial-tracking error signal.

FIG. 10 relates to the case where the angle between the focal line F3 and the separation line between the detectors C1 and C2 equals 0° and without astigmatism correction according to the invention. Notably, the direction of the Y-axis (indicated in FIG. 10) corresponds to the tangential direction (that is, the direction tangential to the track to be scanned). The first astigmatic radiation beam forms two half-lobes S7 and S8 and the second astigmatic radiation beam forms two half-lobes S9 and S10. The half-lobes S7 through S10 are oriented so as to form an angle of 45° with the direction of the separation line, that is, with the direction of the track. Thus, the signal $I_{radial}$ (formed according to Equation (5)) equals 0. In other words, detection of the radial-tracking error is not possible.

It is to be noted that the shapes shown in FIGS. 7 through 10 correspond to the case where the objective lens 19 is too far from the information layer 2. Similar shapes are obtained in the case where the objective lens 19 is too close to the information layer 2 (symmetry with respect to the Y-axis).

It is to be appreciated that numerous variations and modifications may be employed in relation to the embodiments described above, without departing from the scope of the invention which is defined in the appended claims.

As an alternative, the optical scanning device may be of the type capable to performing simultaneous multi-track scanning. This results in improving data read-out in the "reading mode" and/or write speed in the "writing mode" as described, for example, in the U.S. Pat. No. 4,449,212. The description of the multi-tracking arrangement according to the U.S. Pat. No. 4,449,212 is incorporated herein by reference.

As an improvement, the optical scanning device according to the invention further includes a servo lens having an entrance surface facing the astigmatism generating element 9 and an exit surface facing the quadrant detector 28, wherein the entrance surface of the servo lens is arranged for forming the astigmatism correcting element 27. Alternatively, the exit surface (instead of the entrance surface) may be arranged for forming the astigmatism correcting element 27.

An advantage of using the entrance surface of the servo lens as the astigmatism correcting element 9 is to allow the possibility of arranging the exit surface of the servo lens for providing an additional optical function. For instance, the exit surface may be spherically curved.

The invention claimed is:

1. An optical scanning device (1) for scanning an information layer (2), the device including a radiation source (6) for supplying a first radiation beam (14), a lens system (7) for transforming said first radiation beam to a scanning spot (18) in the position of said information layer, the lens system having an optical axis (OO'), and a detection system (8) including:

an astigmatism generating element (9) for generating a first amount of astigmatism ($W_1$) so as to transform said first radiation beam to a first astigmatic radiation beam (29) having a first focal line ($F_1$) and a second focal line ($F_2$) which is further from said astigmatism generating element than said first focal line, said first amount of astigmatism ($W_1$) being represented by a vector ($W_{o,1}$, $\theta_1$) in a reference plane (XY) perpendicular to said optical axis, where $W_{o,i}$ represents the magnitude of $W_i$ and $\theta_i$ represents the angle between said first focal line and a reference axis (X) which is perpendicular to said optical axis;

an astigmatism correcting element (27) for generating a second amount of astigmatism ($W_2$) so as to transform said first astigmatic radiation beam to a second astigmatic radiation beam (30) having a third amount of astigmatism ($W_3$), said second amount of astigmatism ($W_2$) being represented by a vector ($W_{o,2}$, $\theta_2$) in said reference plane, and said third amount of astigmatism ($W_3$) being represented by a vector ($W_{o,3}$, $\theta_3$) in said reference plane, and a detector (28) for transforming said third radiation beam to an electrical signal, characterized in that $W_3$ is adapted to said detector and that $W_{o,2}$ and $\theta_2$ comply substantially with the following equation:

$$(W_{o,1}, 2\theta_1) + (W_{o,2}, 2\theta_2) = (W_{o,3}, 2\theta_3).$$

2. The optical scanning device (1) as claimed in claim 1, characterized in that said astigmatism generating element (9) includes a first plane parallel plate for use as beam splitter.

3. The optical scanning device (1) as claimed in claim 1, characterized in that said astigmatism correcting element (27) is formed by a cylindrical surface having an axis of symmetry that has a predetermined first angle ($\gamma_{cyl}$) with to respect said reference axis (X) and in that said predetermined first angle is given by the following equation:

$$\gamma_{cyl} - \theta_3 = \tfrac{1}{2}\text{Arc}\sin[W_{o,1}\sin(2(\theta_1-\theta_3))/(W_{o,3}^2 + W_{o,1}^2 - 2W_{o,3}W_{o,1}\cos(2(\theta_1-\theta_3)))^{1/2}]$$

wherein $\theta_1 - \theta_3$, $W_{o,1}$ and $W_{o,3}$ satisfy the following condition:

$$W_{o,3}^2 + W_{o,1}^2 > 2W_{o,3}W_{o,1}\cos(2(\theta_1-\theta_3)).$$

4. The optical scanning device (1) as claimed in claim 3, characterized in the astigmatic distance ($\Delta f_2$) of said cylindrical surface is given by the following equation:

$$W_{o,2} = [W_{o,3}^2 + W_{o,1}^2 - 2W_{o,3}W_{o,1}\cos(2(\theta_1-\theta_3))]^{1/2}$$

where $\theta_1 - \theta_3$, $W_{o,1}$, $W_{o,3}$, satisfy the following condition:

$$W_{o,3}^2 + W_{o,1}^2 > 2W_{o,3}W_{o,1}\cos(2(\theta_1-\theta_3)).$$

5. The optical scanning device (1) as claimed in claim 1, characterized in that said astigmatism correcting element (27) is formed by a second plane parallel plate having a normal direction (N2).

6. The optical scanning device (1) as claimed in claim 2, characterized in that said astigmatism correcting element (27) is formed as the entrance surface of a servo lens facing said astigmatism generating element (9) and in that said servo lens has an entrance surface and an exit surface facing said detector (28), one of these surfaces being anisotropically curved.

7. The optical scanning device (1) as claimed in claim 1, characterized in that said detector (28) is formed by a quadrant detector having a separation line in the direction of said reference axis (X) and in that $W_3$ is adapted to said detector (28) so that the angle $\theta_3$ substantially equals 45°.

8. The optical scanning device (1) as claimed in claim 1, characterized in that said detection system (8) is further arranged for providing a focus error signal ($I_{focus}$) and/or a radial-tracking error signal ($I_{radial}$) and in that it further includes a servo circuit (10) and an actuator (11, 12) responsive to said focus error signal and/or said radial-tracking error signal for controlling the position of said scanning spot (18) with respect to the position of said information layer (2) and/or of a track of said information layer which is to be scanned.

9. The optical scanning device (1) as claimed in claim 1, characterized in that it further includes an information processing unit for error correction (13).

10. The optical scanning device (1) as claimed in claim 1, characterized in that said lens system (7) includes a first objective lens (19) and a second objective lens (21) that form a doublet-lens system.

* * * * *